United States Patent
Ramachandran et al.

(10) Patent No.: US 9,049,076 B1
(45) Date of Patent: Jun. 2, 2015

(54) CONTENT SELECTION WITH PRIVACY FEATURES

(71) Applicants: Vinod Kumar Ramachandran, Sunnyvale, CA (US); Nareshkumar Rajkumar, San Jose, CA (US)

(72) Inventors: Vinod Kumar Ramachandran, Sunnyvale, CA (US); Nareshkumar Rajkumar, San Jose, CA (US)

(73) Assignee: Google Inc., Mountain View, CA (US)

( * ) Notice: Subject to any disclaimer, the term of this patent is extended or adjusted under 35 U.S.C. 154(b) by 208 days.

(21) Appl. No.: 13/735,432

(22) Filed: Jan. 7, 2013

(51) Int. Cl.
*G06F 15/16* (2006.01)
*H04L 29/08* (2006.01)

(52) U.S. Cl.
CPC .................. *H04L 29/0809* (2013.01)

(58) Field of Classification Search
USPC .................. 709/220, 222, 224, 203, 217, 218
See application file for complete search history.

(56) References Cited

U.S. PATENT DOCUMENTS

| | | | |
|---|---|---|---|
| 5,802,518 A * | 9/1998 | Karaev et al. .......................... 1/1 |
| 6,691,106 B1 * | 2/2004 | Sathyanarayan ..................... 1/1 |
| 7,779,089 B2 * | 8/2010 | Hessmer et al. ............. 709/220 |
| 7,904,448 B2 * | 3/2011 | Chung et al. .................. 707/721 |
| 8,019,692 B2 * | 9/2011 | Rosen ............................ 705/319 |
| 8,037,097 B2 | 10/2011 | Guo et al. |
| 8,321,278 B2 * | 11/2012 | Haveliwala et al. ....... 705/14.66 |
| 8,468,271 B1 * | 6/2013 | Panwar et al. ................ 709/249 |
| 8,566,156 B2 * | 10/2013 | Thfoin ........................ 705/14.43 |
| 8,762,326 B1 * | 6/2014 | Zhou et al. .................... 707/609 |
| 2002/0112013 A1 | 8/2002 | Walsh |
| 2004/0141003 A1 * | 7/2004 | Nivers et al. .................. 345/745 |
| 2006/0242275 A1 * | 10/2006 | Shapiro .......................... 709/220 |
| 2007/0067444 A1 * | 3/2007 | McCarty et al. .............. 709/224 |
| 2007/0073585 A1 | 3/2007 | Apple et al. |
| 2007/0198670 A1 * | 8/2007 | Andreev et al. ............... 709/220 |
| 2007/0239519 A1 * | 10/2007 | Walker et al. .................... 705/10 |
| 2008/0208852 A1 * | 8/2008 | Kuttikkad et al. ................ 707/6 |
| 2010/0138485 A1 * | 6/2010 | Chow et al. .................... 709/203 |
| 2010/0153516 A1 * | 6/2010 | Weinberg et al. ............. 709/217 |
| 2010/0192198 A1 * | 7/2010 | Crick et al. ........................ 726/2 |
| 2011/0078309 A1 * | 3/2011 | Bloch et al. .................... 709/224 |
| 2011/0179110 A1 * | 7/2011 | Soloway ........................ 709/203 |
| 2011/0295612 A1 * | 12/2011 | Donneau-Golencher et al. .............................. 705/1.1 |
| 2011/0321167 A1 | 12/2011 | Wu et al. |
| 2012/0209904 A1 * | 8/2012 | Huang ........................... 709/203 |
| 2012/0324043 A1 * | 12/2012 | Burkard et al. ............... 709/217 |
| 2013/0297778 A1 * | 11/2013 | Hong et al. .................... 709/224 |
| 2014/0344345 A1 * | 11/2014 | Venkatraman et al. ........ 709/203 |

OTHER PUBLICATIONS

Google bolsters mobile apps with expandable app extensions, Android central, url: www.androidcentral.com/google-bolsters-mobile-apps-expandable-app extensions, Jul. 29, 2010, 5 pages.

\* cited by examiner

*Primary Examiner* — Sargon Nano
(74) *Attorney, Agent, or Firm* — Foley and Lardner LLP; John D. Lanza

(57) ABSTRACT

Systems and methods for content selection with privacy features include determining that a period of time from when the cookie was last used to visit a webpage has exceeded a threshold value. Based on the determination, the topic may be removed from an interest category profile used to select content.

18 Claims, 6 Drawing Sheets

CONTENT SELECTION WITH PRIVACY FEATURES

BACKGROUND

The present disclosure relates generally to selecting content for presentation to a user using a device identifier. More specifically, the present disclosure relates to expiring the use of data associated with a first device identifier to select content for a second device identifier, if the first device identifier is determined to be inactive.

Online content may be available regarding any number of disparate topics. For example, a first website on the Internet may be devoted to the migratory habits of pandas and a second website may be devoted to automotive repair. In many cases, a user must proactively seek out online content of interest to the user. For example, an Internet user may utilize a search engine to search for webpages devoted to automotive repair. The user may then navigate between the webpages in the search results until the user finds the webpage that most closely matches the user's interests.

SUMMARY

Implementations of the systems and methods for content selection with privacy features are disclosed herein. One implementation is a method of limiting the use of data associated with a cookie set within a web browser on a client device, the cookie being associated with a topic. The method includes receiving, at a processor, a device identifier from an application on the client device that differs from the web browser. The method further includes associating, by the processor, the device identifier with the cookie. The method also includes including, by the processor, the topic in an interest category profile and selecting, by the processor, content for presentation within the second application using the interest category profile. The method further includes determining, by the processor, that a period of time from when the cookie was last used to visit a webpage has exceeded a threshold value. The method yet further includes removing, by the processor, the topic associated with the cookie from the interest category profile based on the determination that the period of time has exceeded the threshold value to create a reduced topic set. The method also includes selecting, by the processor, content using the reduced interest category profile.

Another implementation is a system for limiting the use of data associated with a cookie set within a web browser on a client device, the cookie being associated with a topic. The system includes a processor configured to receive a device identifier from an application on the client device that differs from web browser. The processor is further configured to associate the device identifier with the cookie. The processor is also configured to include the topic in an interest category profile and to select content for presentation within the second application using the interest category profile. The processor is further configured to determine that a period of time from when the cookie was last used to visit a webpage has exceeded a threshold value. The processor is yet further configured to remove the topic associated with the cookie from the interest category profile based on the determination that the period of time has exceeded the threshold value to create a reduced topic set. The processor is also configured to select content using the reduced interest category profile.

A further implementation is a method of limiting the use of data associated with a cookie set within a web browser on a first client device, the cookie being associated with a topic. The method includes associating the cookie with a device identifier for a second client device based on the cookie and the device identifier being used to access an online account. The method also includes including, by the processor, the topic in an interest category profile. The method further includes selecting, by the processor, content for presentation by the second device based on the interest category profile. The method additionally includes determining, by the processor, that a period of time from when the cookie was last used to visit a webpage has exceeded a threshold value. The method also includes removing the topic from the interest category profile based on the determination that the period of time has exceeded the threshold value. The method further includes selecting, by the processor, content using the reduced interest category profile.

These implementations are mentioned not to limit or define the scope of the disclosure, but to provide an example of an implementation of the disclosure to aid in understanding thereof. Particular implementations may be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Figure 1:
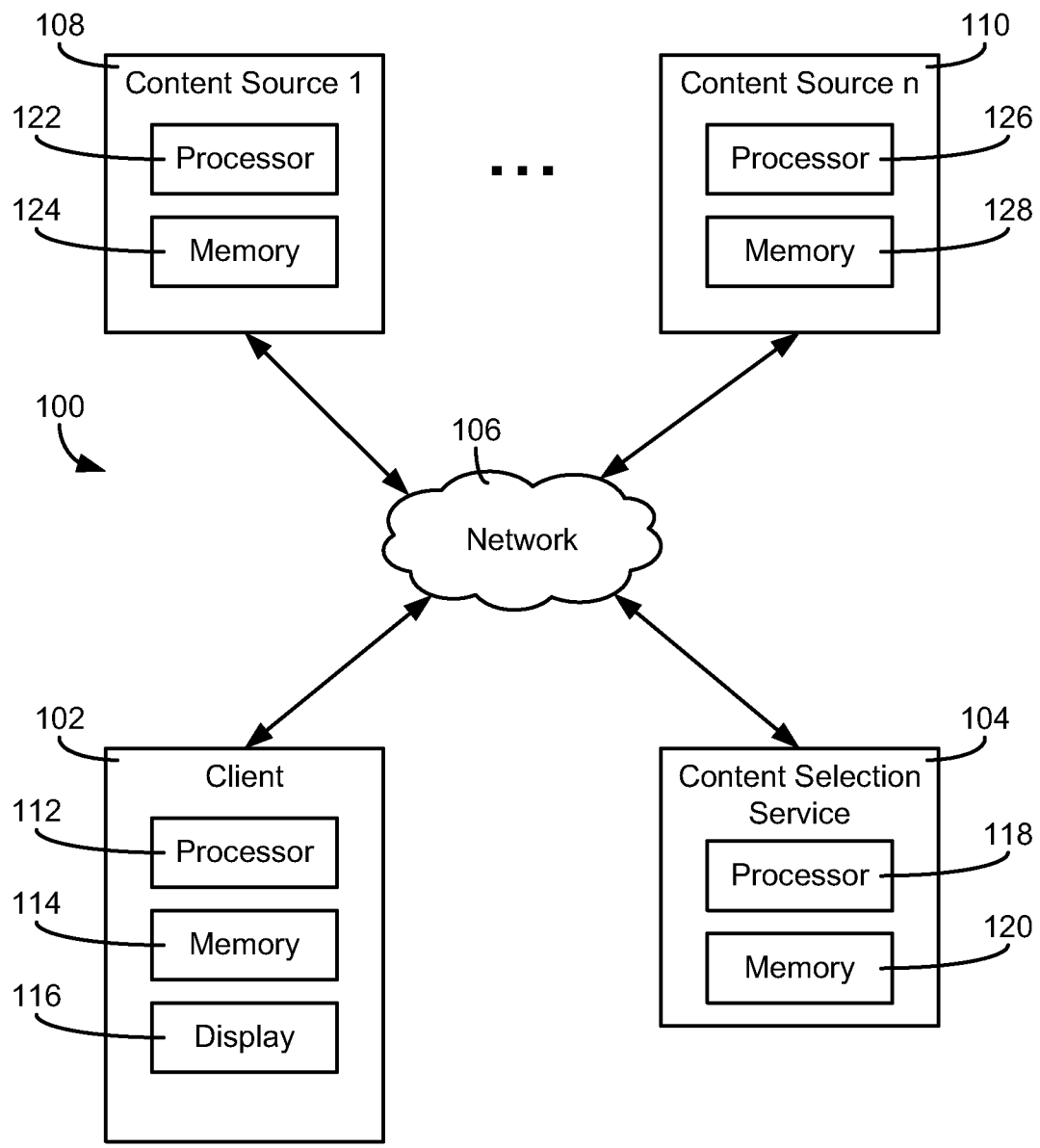
FIG. 1 is a block diagram of a computer system in accordance with a described implementation.

According to some aspects of the present disclosure, first-party and third-party content may be provided to a client device. As used herein, first-party content refers to the primary online content requested or displayed by the client device. For example, first-party content may be a webpage requested by the client or a stand-alone application (e.g., a video game, a chat program, etc.) running on the device. Third-party content, in contrast, refers to additional content that may be provided in conjunction with the first-party content. For example, third-party content may be a public service announcement or an advertisement that appears in conjunction with a requested webpage (e.g., a search result webpage from a search engine, a webpage that includes an online article, a webpage of a social networking service, etc.) or within a stand-alone application (e.g., an advertisement within a game, a messaging program, a navigation program, etc.). Generally, a first-party content provider may be any content provider that allows another content provider (i.e., a third-party content provider) to provide content in conjunction with that of the first-party. The first-party content provider may or may not be compensated for allowing a third-party provider to provide content with the first-party provider's content. For example, the first-party provider may receive compensation for allowing certain paid public service announcements or advertisements to be provided in conjunction with the first-party provider's content.

A first-party content provider may allow a content selection service to determine which third-party content is to be provided in conjunction with the first-party provider's content. One or more third-party content providers may also use the content selection service to provide third-party content in conjunction with content from any number of first-party providers. In some cases, the content selection service may dynamically select which third-party content is presented in conjunction with a first-party provider's content. For example, a first-party webpage may display different advertisements selected by the service during different visits to the webpage. The content selection service may determine which third-party content is to be provided based on any number of factors (e.g., whether the third-party content and first-party content relate to the same topic). For example, a third-party advertisement for golf clubs may appear on a webpage devoted to reviews of golf resorts. The content selection service may also conduct a content auction to select the third-party content to be provided from among the various third-party content providers.

According to various implementations, a content selection service may use a device identifier to represent and identify a user's device. A device identifier may be, but is not limited to, a cookie set via a web browser application on the client device, a hardware-based identifier for the client device, a universally unique identifier (UUID) for an application installed on the client device, or a telephone number for the client device. For example, a device's UDID may be a text string hexadecimal value that combines hardware-based identifiers of the device for purposes of uniquely identifying the device to application developers and other interested parties (e.g., a UDID may be based on the device's serial number, MAC address, etc.). A device identifier may also be anonymized, such that personally-identifiable information about the user is not accessible from the device identifier. For example, a UDID may be a one-way hashed value usable only by the content selection service for purposes of identifying the device and selecting content for it (e.g., a text value that combines a device's hardware-based identifiers may be hashed and the hashed value used to identify the device).

In some implementations, history data indicative of webpages and other content received by a device identifier may be analyzed by a content selection service to determine potential interests of the corresponding user. For example, the content selection service may receive history data for a device identifier that indicates that ten webpages devoted to golf were visited by the device identifier. In such a case, the content selection service may associate the device identifier with a golf-related interest category (e.g., by generating a database table entry that links the device identifier to the interest category). The content selection service may then select third-party content for the device identifier based in part on its associated interest category. For example, the content selection service may select third-party content related to golf to be presented in conjunction with a first-party webpage or application. Thus, the content selection service may select third-party content that may be of relevance to a particular user.

According to various implementations, one or more device identifiers may be linked. For example, assume that a user's device is represented by a cookie set via the device's web browser and a UDID used to represent the device within another installed application (e.g., a game, navigation program, etc.). In such a case, both device identifiers represent the same device and may be linked. In some implementations, device identifiers from different devices may also be linked. For example, assume that a user has a home computer and a mobile device, such as a mobile phone. Also, assume that the user operates both devices to log into an online email program. In such a case, the device identifiers for both devices may be associated or linked together in memory at a computer server based on their common use to access the user's account.

In cases in which device identifiers are associated, history data for one of the identifiers may be used by a content selection service to select content for any of the other device identifiers linked to it. For example, a user may visit a number of golf-related webpages and history data regarding these visits may be received via a browser cookie on the user's device. Based on this history data, the content selection service may select golf-related content for the cookie (e.g., when the user visits other webpages) and/or for any other device identifiers associated with the cookie. For example, a golf-related advertisement may be selected by the service for display within a game running on the device, based on the game's UDID being associated with the cookie. Similarly, visits to golf-related webpages by a user's home computer may result in a golf-related advertisement being selected for display by the user's mobile phone.

A user wishing to stop allowing a content selection service to store history data regarding the user's web browsing habits may, in some cases, explicitly notify the service of his or her decision. However, in some cases, a user may simply clear a browser cookie used by a content selection service from his or her device. Since the cookie was deleted from the user's device, the content selection service will no longer receive the cookie to select content for presentation to the user via the browser. However, history data associated with the cookie may still be used by the service to select content for any other device identifiers linked with the cookie. For example, if the user clears his cookies on a home computer but not on his mobile phone, the content selection service may still use history data for the home computer's cookie to select content for the user's phone.

According to various implementations, a content selection service may expire the use of history data associated with a first device identifier to select content for one or more other device identifiers associated with it. In some implementations, a device identifier may be deemed inactive by the content selection service after a certain amount of time has passed since the service last received the device identifier. For example, assume that a user has cleared his browser cookies, including a cookie used by the content selection service. In such a case, the content selection service will no longer receive the cookie and may determine the cookie to be inactive after not receiving it for a certain amount of time (e.g., n-number of days, weeks, months, etc.). In some implementations, the content selection service may permanently remove the history data from further use to select content for any linked device identifiers. In other implementations, the content selection service may only permanently remove the history data from further use to select content, if the device identifier has been inactive for a specific amount of time. Prior to this time, the history data may be placed in a hold state and not used by the service to select content for any of the linked device identifiers. If the inactive device identifier associated with the history data is received by the content selection service prior to reaching the threshold amount of inactivity, the service may reactivate the history data for purposes of selecting content for any of the other linked device identifiers.

Referring to FIG. 1, a block diagram of a computer system 100 in accordance with a described implementation is shown. System 100 includes a client 102 which communicates with other computing devices via a network 106. Client 102 may execute a web browser or other application (e.g., a video game, a messenger program, a media player, a social networking application, a navigation program, etc.) to retrieve content from other devices over network 106. For example, client 102 may communicate with any number of content sources 108, 110 (e.g., a first content source through nth content source). Content sources 108, 110 may provide webpage data and/or other content, such as images, video, audio, or an application to client 102. Computer system 100 may also include a content selection service 104 configured to select content to be provided to client 102. For example, content source 108 may provide a first-party webpage to client 102 that includes additional third-party content selected by content selection service 104.

Network 106 may be any form of computer network that relays information between client 102, content sources 108, 110, and content selection service 104. For example, network 106 may include the Internet and/or other types of data networks, such as a local area network (LAN), a wide area network (WAN), a cellular network, satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections. For example, client 102 may communicate wirelessly (e.g., via WiFi, cellular, radio, etc.) with a transceiver that is hardwired (e.g., via a fiber optic cable, a CAT5 cable, etc.) to other computing devices in network 106.

Client 102 may be any number of different types of user electronic devices configured to communicate via network 106 (e.g., a laptop computer, a desktop computer, a tablet computer, a smartphone, a digital video recorder, a set-top box for a television, a video game console, combinations thereof, etc.). Client 102 is shown to include a processor 112 and a memory 114, i.e., a processing circuit. Memory 114 may store machine instructions that, when executed by processor 112 cause processor 112 to perform one or more of the operations described herein. Processor 112 may include a microprocessor, ASIC, FPGA, etc., or combinations thereof. Memory 114 may include, but is not limited to, electronic, optical, magnetic, or any other storage or transmission device capable of providing processor 112 with program instructions. Memory 114 may include a floppy disk, CD-ROM, DVD, magnetic disk, memory chip, ROM, RAM, EEPROM, EPROM, flash memory, optical media, or any other suitable memory from which processor 112 can read instructions. The instructions may include code from any suitable computer programming language such as, but not limited to, C, C++, C#, Java, JavaScript, Perl, HTML, XML, Python and Visual Basic.

Client 102 may include one or more user interface devices. A user interface device may be any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to the housing of client 102 (e.g., a built-in display, microphone, etc.) or external to the housing of client 102 (e.g., a monitor connected to client 102, a speaker connected to client 102, etc.), according to various implementations. For example, client 102 may include an electronic display 116, which displays webpages and other data received from content sources 108, 110 and/or content selection service 104. In various implementations, display 116 may be located inside or outside of the same housing as that of processor 112 and/or memory 114. For example, display 116 may be an external display, such as a computer monitor, television set, or any other stand-alone form of electronic display. In other examples, display 116 may be integrated into the housing of a laptop computer, mobile device, or other form of computing device having an integrated display.

Content sources 108, 110 may be one or more electronic devices connected to network 106 that provide content to devices connected to network 106. For example, content sources 108, 110 may be computer servers (e.g., FTP servers, file sharing servers, web servers, etc.) or combinations of servers (e.g., data centers, cloud computing platforms, etc.). Content may include, but is not limited to, webpage data, a text file, a spreadsheet, images, search results, and other forms of electronic documents. Similar to client 102, content sources 108, 110 may include processing circuits comprising processors 122, 126 and memories 124, 128, respectively, that store program instructions executable by processors 122, 126. For example, the processing circuit of content source 108 may include instructions such as web server software, FTP serving software, and other types of software that cause content source 108 to provide content via network 106.

Similar to content sources 108, 110, content selection service 104 may be one or more electronic devices connected to network 106. Content selection service 104 may be a computer server (e.g., FTP servers, file sharing servers, web servers, etc.) or a combination of servers (e.g., a data center, a cloud computing platform, etc.). Content selection service 104 may have a processing circuit including a processor 118 and a memory 120 that stores program instructions executable by processor 118. In cases in which content selection service 104 is a combination of computing devices, processor 118 may represent the collective processors of the devices and memory 120 may represent the collective memories of the devices.

Client 102 may identify itself to content selection service 104 through the use of one or more device identifiers. Device identifiers may include, but are not limited to, cookies, UDIDs, device serial numbers, telephone numbers, or network addresses. For example, content selection service 104 may set a cookie on client 102 when client 102 visits a particular webpage. On subsequent webpage visits, the cookie may be sent by client 102 to content selection service 104, allowing content selection service 104 to attribute the different webpage visits to the same client device.

According to various implementations, content sources 108, 110 may provide webpage data to client 102 that includes one or more content tags. In general, a content tag may be any piece of webpage code associated with the action of including third-party content with a first-party webpage. For example, a content tag may define a slot on a webpage for third-party content, a slot for out of page third-party content (e.g., an interstitial slot), whether third-party content should be loaded asynchronously or synchronously, whether the loading of third-party content should be disabled on the webpage, whether third-party content that loaded unsuccessfully should be refreshed, the network location of a content source that provides the third-party content (e.g., content sources 108, 110, content selection service 104, etc.), a network location (e.g., a URL) associated with clicking on the third-party content, how the third-party content is to be rendered on a display, a command that causes client 102 to set a browser cookie (e.g., via a pixel tag that sets a cookie via an image request), one or more keywords used to retrieve the third-party content, and other functions associated with providing third-party content with a first-party webpage. In other words, a content tag may cause client 102 to send a content selection request to content selection service 104. For example, content source 108 may provide webpage data that causes client 102 to retrieve third-party content from content selection service 104. In another implementation, content may be selected by content selection service 104 and provided by content source 108 as part of the first-party webpage data sent to client 102. In a further example, content selection service 104 may cause client 102 to retrieve third-party content from a specified location, such as memory 114 or content sources 108-110.

Content sources 108, 110 may also provide an executable application to client 102. Exemplary applications may include, but are not limited to, messaging programs (e.g., chat programs, email programs, text messaging programs, etc.), navigation programs, games, scheduling programs (e.g., programs that allow a user maintain a list of appointments, etc.), social networking applications, and content-streaming programs (e.g., audio streaming applications, video streaming applications, etc.). In other implementations, an application installed on client 102 may be pre-installed (e.g., by the manufacturer or retailer) and configured to receive content from content sources 108, 110. For example, a pre-installed media player application may be configured to download or stream a song from content source 108. An application executed by client 102 may be configured to provide a device identifier for the application to content selection service 104. For example, the application may be configured to generate and/or provide a UDID or other device identifier to content selection service 104. Such a device identifier may be provided by client 102 to content selection service 104 as part of a content selection request. For example, a game on client 102 may request an advertisement from content selection service 104 to be presented within the game.

Content selection service 104 may receive and use history data associated with a device identifier to select relevant content for the corresponding user. History data may be any data associated with a device identifier that is indicative of actions or events at client 102 (e.g., visiting a webpage, interacting with presented content, conducting a search, making a purchase, downloading content, etc.). For example, a cookie may be sent from client 102 to content selection service 104 when the user of client 102 visits a particular webpage devoted to a topic. In another example, a non-browser application on client 102 may provide history data to content selection service 104 when a particular type of event occurs in the application (e.g., the player reaches a new level of a game, a song or video clip finishes playing, etc.). In further examples, history data may include data regarding whether a particular piece of third-party content has already been provided to client 102 or another device associated with the user of client 102 (e.g., to control how often a particular piece of selected content is presented to a user). Based in part on the analyzed history data, content selection service 104 may select third-party content to be provided in conjunction with first-party content (e.g., as part of a displayed webpage, as a pop-up, within a video game, within another type of application, etc.).

Content selection service 104 may analyze received history data associated with a device identifier to identify one or more topics that may be of interest to the corresponding user. Content selection service 104 may then associate an identified topic with the device identifier. For example, content selection service 104 may perform text and/or image analysis on a webpage from content source 108, to determine one or more topics of a webpage visited by the device identifier. In some implementations, a topic may correspond to a predefined interest category used by content selection service 104. Such an interest category may be associated with the device identifier by content selection service 104. For example, a webpage devoted to the topic of golf may be classified under the interest category of sports. If history data for a device identifier signifies a visit to the golf-related webpage, the interest category of sports may be associated with the device identifier and used by content selection service 104 to select content for the device identifier. In some cases, interest categories used by content selection service 104 may conform to a taxonomy (e.g., an interest category may be classified as falling under a broader interest category). For example, the interest category of golf may be /Sports/Golf, /Sports/Individual Sports/Golf, or under any other hierarchical category.

The third-party content selected by content selection service 104 may be provided by content selection service 104 to client 102 via network 106. For example, content source 110 may upload the third-party content to content selection service 104. Content selection service 104 may then provide the third-party content to client 102 to be presented in conjunction with a first-party webpage provided by content source 108. In other implementations, content selection service 104 may provide an instruction to client 102 that causes client 102 to retrieve the selected third-party content (e.g., from memory 114 of client 102, from content source 110, etc.).

According to various implementations, content selection service 104 may link multiple device identifiers. In some implementations, the device identifiers may be for the same client device. For example, a cookie set on client 102 may be associated with a UDID for a game application on client 102. In further implementations, device identifiers may be linked across different client devices. For example, device identifiers for a user's mobile phone and home computer may be linked by content selection service 104. Device identifiers may be linked across different devices in any number of ways. In some cases, device identifiers may be linked based on the corresponding devices being used to access an online account or profile. For example, assume that the user of client 102 has an online profile with a social networking service provided by content source 110. If the user logs into his or her profile from client 102 and another device, the device identifiers for these two devices may be linked.

Content selection service 104 may use history data for a first device identifier to select content for a second device identifier, if the two identifiers are linked. For example, content selection service 104 may analyze history data for the first device identifier to associate the first device identifier with a golf-related interest category (e.g., the first device identifier visited one or more golf-related webpages). In such a case, content selection service 104 may use the golf-related interest category to also select content for the second device identifier. For example, content selection service 104 may select a golf-related advertisement for presentation within a game application on client 102, based on the user of client 102 visiting golf-related webpages.

In various implementations, content selection service 104 may remove history data associated with a first device identifier from consideration to select content for another device identifier linked to the first device identifier. In some implementations, a device identifier may be deemed inactive by content selection service 104 after a predetermined amount of time has passed since content selection service 104 last received the device identifier or an action was indicated in the history data for the identifier. For example, assume that a cookie set on client 102 has not been used in two days. In such a case, content selection service 104 may determine the cookie to be in an inactive state. History data associated with the inactive cookie may not be used by content selection service 104 for any other device identifiers linked to the cookie. For example, a user's visits to golf-related webpages via client 102 may not be used by content selection service 104 to select third-party content for other applications on client 102 or any of the user's other devices. In some implementations, history data for the one or more device identifiers linked to the inactive identifier may still be used by content selection service 104 to select content for these identifiers.

Content selection service 104 may delete the history data for an inactive device identifier or permanently remove the history data from consideration for any linked device identifiers. In some implementations, this may be done in response to the device identifier being determined by content selection service 104 to be in an inactive state. In other implementations, content selection service 104 may wait a second threshold amount of time before deleting the history data or permanently removing it from consideration for other device identifiers, if the device identifier remains in an inactive state. For example, a device identifier may be deemed inactive by content selection service 104 after two days of inactivity and its history data permanently removed from consideration for other device identifiers after thirty days of inactivity. Thus, the history data for an inactive device identifier may be placed on hold for a period of time. In some implementations, the history data may be restored for consideration for the other device identifiers, if content selection service 104 determines that the inactive device identifier is again active. For example, assume that two weeks have elapsed since a device identifier was last used. In such a case, the device identifier may have been deemed inactive by content selection service 104 and its associated history data placed on hold. Since the device identifier is again in use, content selection service 104 may remove the inactive status from the device identifier and begin using its associated history data again to select content for any linked device identifiers. In further implementations, content selection service 104 may not utilize a hold status for history data. For example, content selection service 104 may simply delete or permanently remove the history data from consideration, in response to determining that the device identifier associated with the history data is inactive.

Figure 2:
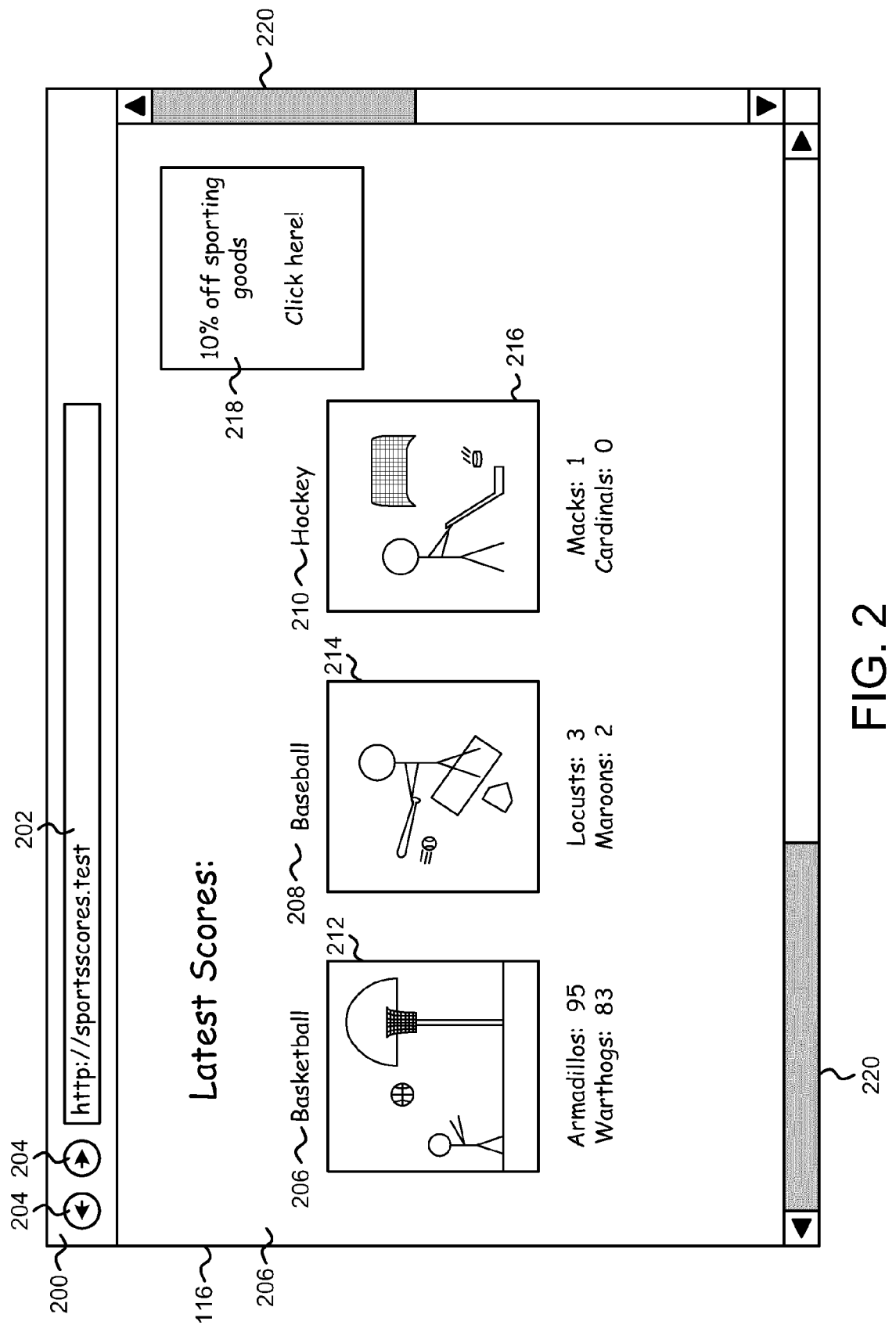
FIG. 2 is an illustration of an electronic display showing an example webpage.

Referring now to FIG. 2, an illustration is shown of electronic display 116 displaying an example webpage 206. Electronic display 116 is in electronic communication with processor 112 which causes visual indicia to be displayed on electronic display 116. As shown, processor 112 may execute a web browser 200 stored in memory 114 of client 102, to display indicia of content received by client 102 via network 106. In other implementations, another application executed by client 102 may incorporate some or all of the functionality described with regard to web browser 200 (e.g., a video game, a chat application, etc.).

Web browser 200 may operate by receiving input of a uniform resource locator (URL) via a field 202 from an input device (e.g., a pointing device, a keyboard, a touch screen, etc.). For example, the URL, http://www.sportsscores.test, may be entered into field 202. Processor 112 may use the inputted URL to request data from a content source having a network address that corresponds to the entered URL. In other words, client 102 may request first-party content accessible at the inputted URL. In response to the request, the content source may return webpage data and/or other data to client 102. Web browser 200 may analyze the returned data and cause visual indicia to be displayed by electronic display 116 based on the data.

In general, webpage data may include text, hyperlinks, layout information, and other data that may be used to provide the framework for the visual layout of webpage 206. In some implementations, webpage data may be one or more files of webpage code written in a markup language, such as the hypertext markup language (HTML), extensible HTML (XHTML), extensible markup language (XML), or any other markup language. The webpage data may include data that specifies where indicia appear on webpage 206, such as text 206, 208, 210. In some implementations, the webpage data may also include additional URL information used by web browser 200 to retrieve additional indicia displayed on webpage 206. For example, the webpage data may also include one or more instructions used by processor 112 to retrieve images 212, 214, 216 from their respective content sources.

Web browser 200 may include a number of navigational controls associated with webpage 206. For example, web browser 200 may be configured to navigate forward and backwards between webpages in response to receiving commands via inputs 204 (e.g., a back button, a forward button, etc.). Web browser 200 may also include one or more scroll bars 220, which can be used to display parts of webpage 206 that are currently off-screen. For example, webpage 206 may be formatted to be larger than the screen of electronic display 116. In such a case, the one or more scroll bars 220 may be used to change the vertical and/or horizontal position of webpage 206 on electronic display 116.

One or more content tags may be embedded into the code of webpage 206 that defines a content field located at the position of third-party content 218. Another content tag may cause web browser 200 to request additional content from content selection service 104, when webpage 206 is loaded. Such a request may include one or more keywords, an indication of the visit to webpage 206, or other data used by content selection service 104 to select content to be provided to client 102. In one example, assume that content selection service 104 has already set a cookie on client 102 via web browser 200. In such a case, the content selection request may include the cookie, to identify client 102 to content selection service 104. In response, content selection service 104 may select third-party content 218 using the cookie or other device identifier sent as part of the request. For example, content selection service 104 may analyze history data associated with the cookie and/or history data associated with any other device identifier linked to the cookie, to select third-party content 218. If the content selection request does not include a device identifier, content selection service 104 may set a cookie or other device identifier at this time for use with future requests from client 102.

As a result of content selection service 104 receiving the cookie set via web browser 200 whenever client 102 visits a website that uses the selection service, content selection service 104 may also receive history data for the cookie. For example, content selection service 104 may receive history data indicative of webpage 206 being visited by the device identifier, when webpage 206 was visited, and one or more topics of webpage 206. In some implementations, content selection service 104 may use text recognition on webpage 206 (e.g., on text 206, 208, 210, etc.) and/or image recognition on webpage 206 (e.g., on images 212, 214, 216, etc.), to determine one or more topics of webpage 206. In further implementations, webpage data for webpage 206 may include metadata that identifies the topic. Such topics may then be used to select content for the cookie and/or any other device identifiers linked to the cookie. For example, as shown, webpage 206 may be devoted to the topic of sports. In such a case, content selection service 104 may select third-party content 218 (e.g., an advertisement for sporting equipment), based on the identified topic.

In some implementations, content selection service 104 may provide third-party content 218 directly to client 102. In other implementations, content selection service 104 may send a command to client 102 that causes client 102 to retrieve third-party content 218. For example, the command may cause client 102 to retrieve third-party content 218 from a local memory, if third-party content 218 is already stored in memory 114, or from a networked content source. In this way, any number of different pieces of content may be placed in the location of third-party content 218 on webpage 206. In other words, one user that visits webpage 206 may be presented with third-party content 218 and a second user that visits webpage 206 may be presented with different content. Other forms of content (e.g., an image, text, an audio file, a video file, etc.) may be selected by content selection service 104 for display with webpage 206 in a manner similar to that of third-party content 218. In further implementations, content selected by content selection service 104 may be displayed outside of webpage 206. For example, content selected by content selection service 104 may be displayed in a separate window or tab of web browser 200, may be presented via another software application (e.g., a text editor, a media player, etc.), or may be downloaded to client 102 for later use.

Figure 3:
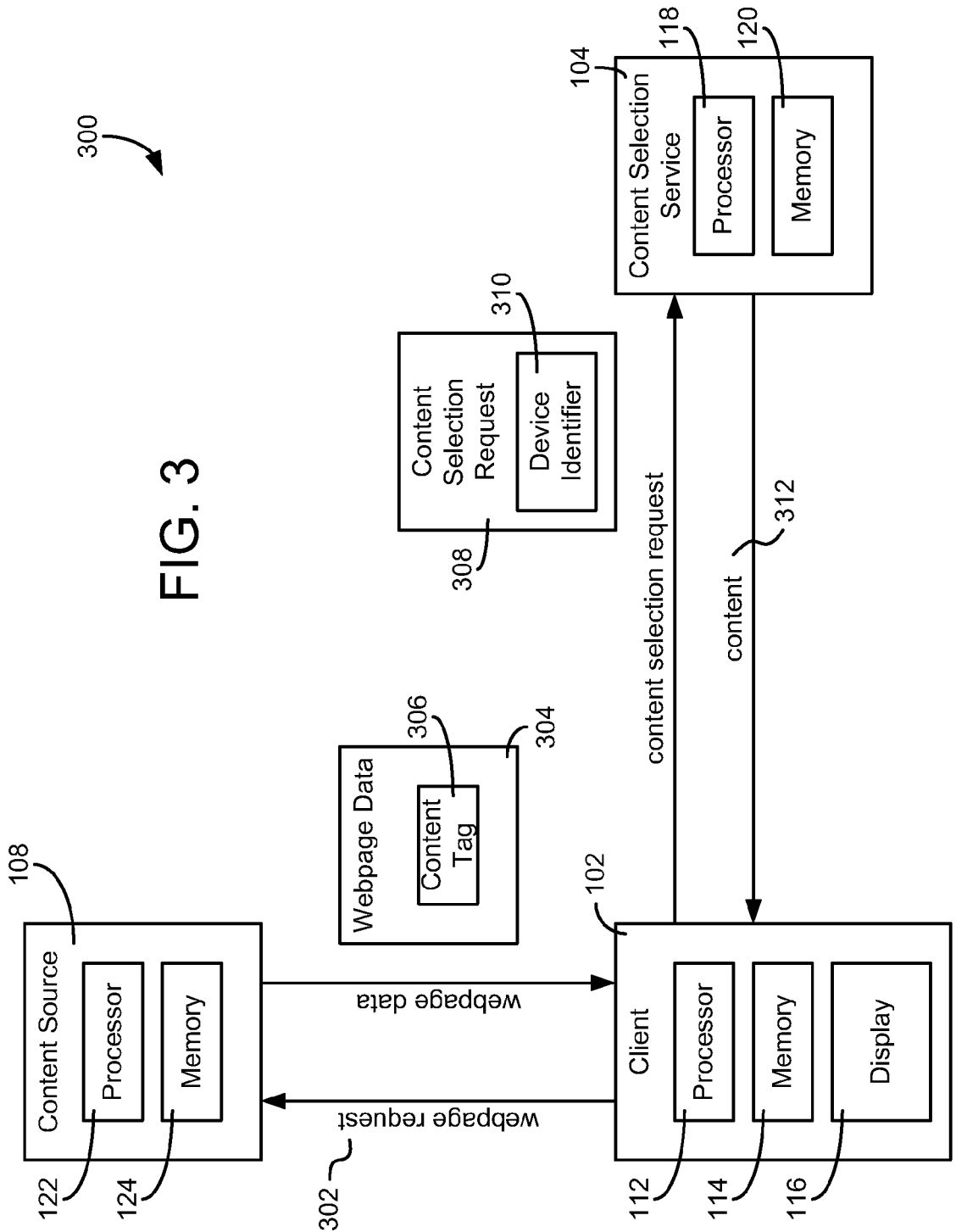
FIG. 3 is an example illustration of content being included with a webpage by a content selection server.

FIG. 3 is an example illustration of content 312 being selected by content selection service 104. As shown, client 102 may send a webpage request 302 to a content source via network 106, such as content source 108. For example, webpage request 302 may be a request that conforms to the hypertext transfer protocol (HTTP), such as the following:

GET /main.html HTTP/1.1
Host: sportsscores.test

Such a request may include the name of the file to be retrieved, main.html, as well as the network location of the file, www.sportsscores.test. A network location may be an IP address or may be a domain name that resolves to an IP address of content source 108. In some implementations, a device identifier, such as a cookie associated with content source 108, may be included with webpage request 302 to identify client 102 to content source 108.

In response to receiving webpage request 302, content source 108 may return webpage data 304, such as the requested file, "main.html." Webpage data 304 may be configured to cause client 102 to display a webpage on electronic display 116 when opened by a web browser application. In some cases, webpage data 304 may include code that causes client 102 to request additional files to be used as part of the displayed webpage. For example, webpage data 304 may include an HTML image tag of the form:

<img src="Baseball.jpg">

Such code may cause client 102 to request the image file "Baseball.jpg," from content source 108.

In some implementations, webpage data 304 may include content tag 306 configured to cause client 102 to retrieve an advertisement from content selection service 104. In some cases, content tag 306 may be an HTML image tag that includes the network location of content selection service 104. In other cases, content tag 306 may be implemented using a client-side scripting language, such as JavaScript. For example, content tag 306 may be of the form:

<script type='text/javascripf'>
AdNetwork_RetrieveAd("argument")
</script> where AdNetwork_RetrieveAd is a script function that causes client 102 to send a content selection request 308 to content selection service 104. In various implementations, the argument of the script function may include the network address of content selection service 104, the referring webpage, and/or additional information that may be used by content selection service 104 to select content to be included with the webpage.

Content selection request 308 may include a device identifier 310, used by content selection service 104 to identify client 102. In various implementations, device identifier 310 may be an HTTP cookie previously set by content selection service 104 on client 102, the IP address of client 102, a UDID for client 102, or another form of device identifier. For example, content selection service 104 may set a cookie that includes a unique string of characters on client 102 when content is first requested by client 102 from content selection service 104. Such a cookie may be included in subsequent content selection requests sent to content selection service 104 by client 102.

In some implementations, device identifier 310 may be used by content selection service 104 to store history data for client 102. For example, content selection request 308 may include data relating to which webpage was requested by client 102, when the webpage was requested, and/or other history data. Whenever client 102 visits a webpage that allows content selection service 104 to select content to appear in conjunction with the webpage, content selection service 104 may receive and store history data for client 102. In this way, content selection service 104 is able to reconstruct the various actions and events performed by client 102. In some implementations, content selection service 104 may also receive history data for client 102 from content sources that do not use its content selection services. For example, a website that does not use content selected by content selection service 104 may nonetheless provide information about client 102 visiting the website to content selection service 104.

Device identifier 310 may be sent to content selection service 104 when a particular online event occurs. For example, webpage data 304 may include a content tag 306 that causes client 102 to send device identifier 310 to content selection service 104 when a displayed advertisement is clicked by the user of client 102. Device identifier 310 may also be used to record information after client 102 is redirected to another webpage. For example, client 102 may be redirected to an advertiser's website if the user selects a displayed advertisement. In such a case, device identifier 310 may also be used to record which actions were performed on the advertiser's website. For example, device identifier 310 may be sent to content selection service 104 as the user of client 102 navigates within the advertiser's website. In this way, data regarding whether the user searched for a product, added a product to a shopping cart, completed a purchase on the advertiser's website, etc., may also be recorded by content selection service 104.

Content selection service 104 may analyze history data associated with device identifier 310 to identify one or more interest categories and to generate an interest category profile for the device identifier and/or any other device identifiers linked to it. For example, content selection request 308 may identify one or more themes of the webpage being requested (e.g., content tag 306 includes information regarding the theme of the webpage). In another example, content selection service 104 may perform text analysis and/or image analysis on the webpage to detect one or more themes of the webpage. In further implementations, the requested webpage may be a webpage of a search engine. In such a case, one or more search terms may be used by content selection service 104 to identify an interest category. According to some implementations, content selection service 104 may classify history data as being long-term, short-term, and/or current. The different types of history data may then be analyzed by content selection service 104 to identify long-term, short-term, and/or current interest or product categories. Content selection service 104 may use any identified categories to then generate an interest category profile that includes one or more identified interest categories. Such a profile may then be used by content selection service 104 to select content for client 102 based in part on the one or more interest or product categories in the profile.

In some implementations, device identifier 310 may be linked to one or more other device identifiers. For example, device identifier 310 may be linked to a UDID for another application on client 102 or another device tied to the same user. In such a case, content selection service 104 may also use history data for the linked device identifier to process content selection request 308, provided the linked device identifier is still active. For example, assume that the user of client 102 also used a home computer to view webpages devoted to vacuum cleaners. In such a case, device identifier 310 may be linked to a device identifier for the home computer and history data indicative of the visits to the vacuum cleaner-related webpages. If the device identifier is still active, this history data may also be used by content selection service 104 to process content selection request 308. For example, content 312 selected by content selection service 104 may be related to vacuum cleaners, even if the history data for device identifier 310 does not indicate the topic of vacuum cleaners.

In response to receiving content 312, client 102 may then present content 312 in conjunction with the webpage from content source 108. In some implementations, content selection service 104 may instead select content already stored on client 102 and provide an indication of the selection to client 102. In response, client 102 may retrieve the pre-stored content from memory 114 and display the content as part of the webpage from content source 108.

Content selection service 104 may select content for a non-browser application on client 102 in a similar manner as when content is provided in conjunction with a webpage. In various implementations, a non-browser application on client 102 may send a content selection request to content selection service 104 periodically or in response to a certain event occurring in the application. For example, the application may send a content selection request to content selection service 104 every five minutes for content to be displayed within the application. In other examples, the application may send a content selection request when a piece of media content finishes playing in the application or has played for a certain amount of time, when the user of client 102 views a certain screen of the application, when the user of client 102 reaches a certain level within a game, etc. The content selection request from the non-browser application may be of a similar form as content selection request 308 (e.g., the content selection request may include a device identifier, such as a UDID for the application). In response, content selection service 104 may use the device identifier to select content for client 102 to be presented in conjunction with the game.

Figure 4:
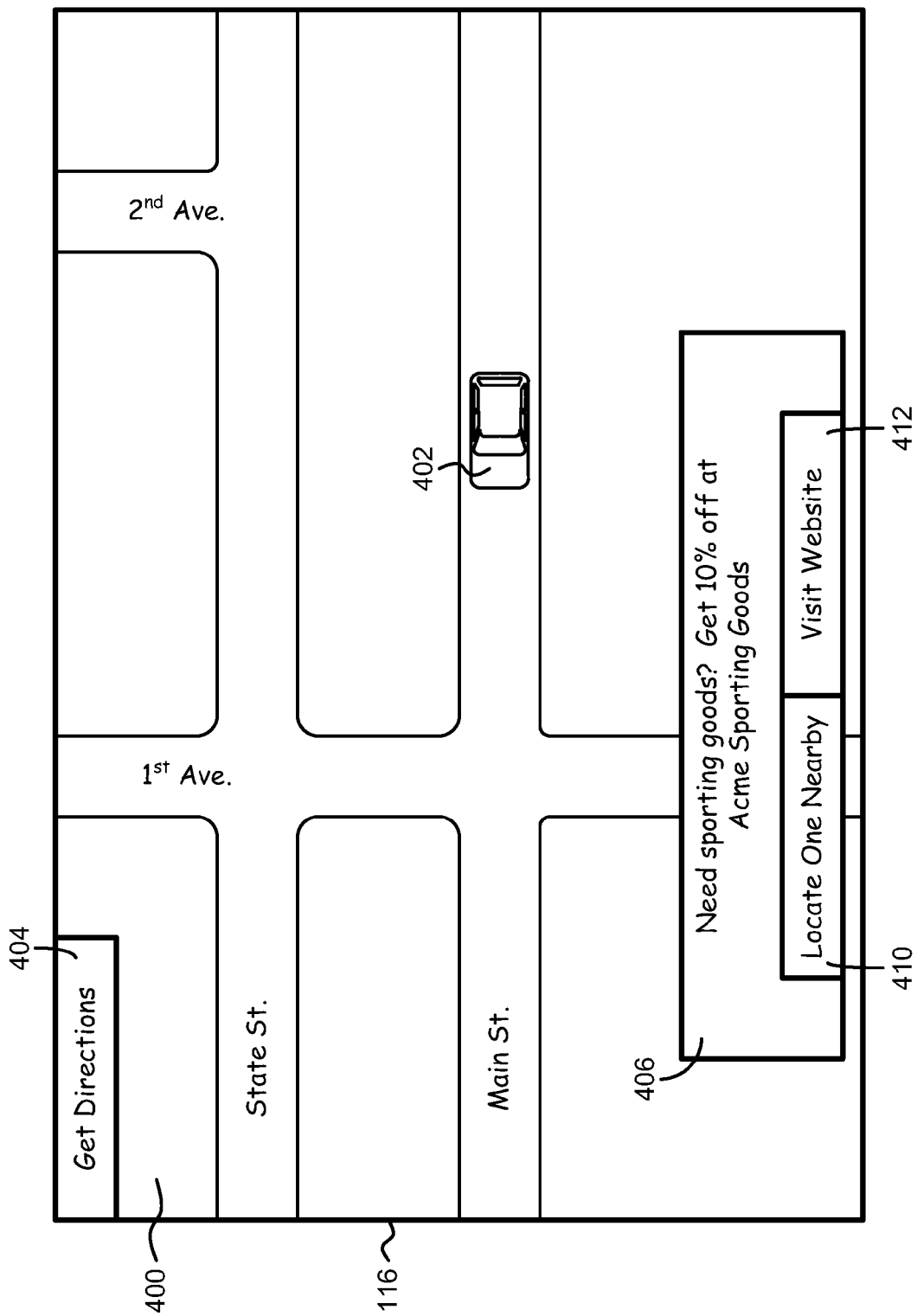
FIG. 4 is an example application displaying selected content.

Referring now to FIG. 4, an application displaying selected content is shown, according to one illustrative example. As shown, client 102 may execute a navigation application 400. In general, navigation application 400 operates to determine the location of client 102 and to provide indicia, such as a map, to electronic display 116. For example, client 102 may include a GPS receiver and/or may use cellular triangulation to determine its location. Navigation application 400 may use the determined location to retrieve a map of the location either from a local memory or from a remote source. Navigation application 400 may then provide the map to electronic display 116 with an indication 402 of the determined location of client 102. Navigation application 400 may also include a selectable input 404 configured to allow the user of client 102 to obtain directions to another location. For example, the user of client 102 may select input 404 to obtain driving directions from the location indicated by indication 402 to another location.

Navigation application 400 may be configured to send a UDID or other form of device identifier as part of a content selection request to content selection service 104. In some implementations, the UDID may be a hashed value, thereby anonymizing the UDID to ensure the privacy of the user of client 102. Such a content selection request may include various information, such as the general or specific location of client 102 or the current actions performed via navigation application 400. For example, the content selection request may also indicate that navigation application 400 is currently being used to obtain driving directions to the nearest pizza restaurant.

In response to receiving the content selection request from navigation application 400, content selection service 104 may select content 406 for presentation within application 400. Content 406 may be selected based in part on history data associated with the device identifier sent as part of the selection request and/or history data for any other device identifiers linked to it. As shown, assume that the UDID or other device identifier sent by navigation application 400 with the selection request is linked to the cookie set in browser 200 shown in FIG. 2. History data for the cookie may indicate the visit to webpage 206 and content selection service 104 may identify sports as a potential interest of the user of client 102 based on this history data. Based in part on this interest, content selection service 104 may select content 406 which is also related to sports (e.g., an advertisement for the sporting goods store, "Acme Sporting Goods."). Thus, the history data for a device identifier other than the one used by navigation application 400 may be used by content selection service 104 to select content 406 for presentation within application 400.

In some implementations, content 406 may include inputs configured to perform operations within application 400. For example, content 406 may include an input 410 configured to locate the nearest Acme Sporting Goods based on the location of client 102. In another example, content 406 may include an input 412 configured to cause a web browser, such as web browser 200, to visit a website of Acme Sporting Goods.

Figure 5:
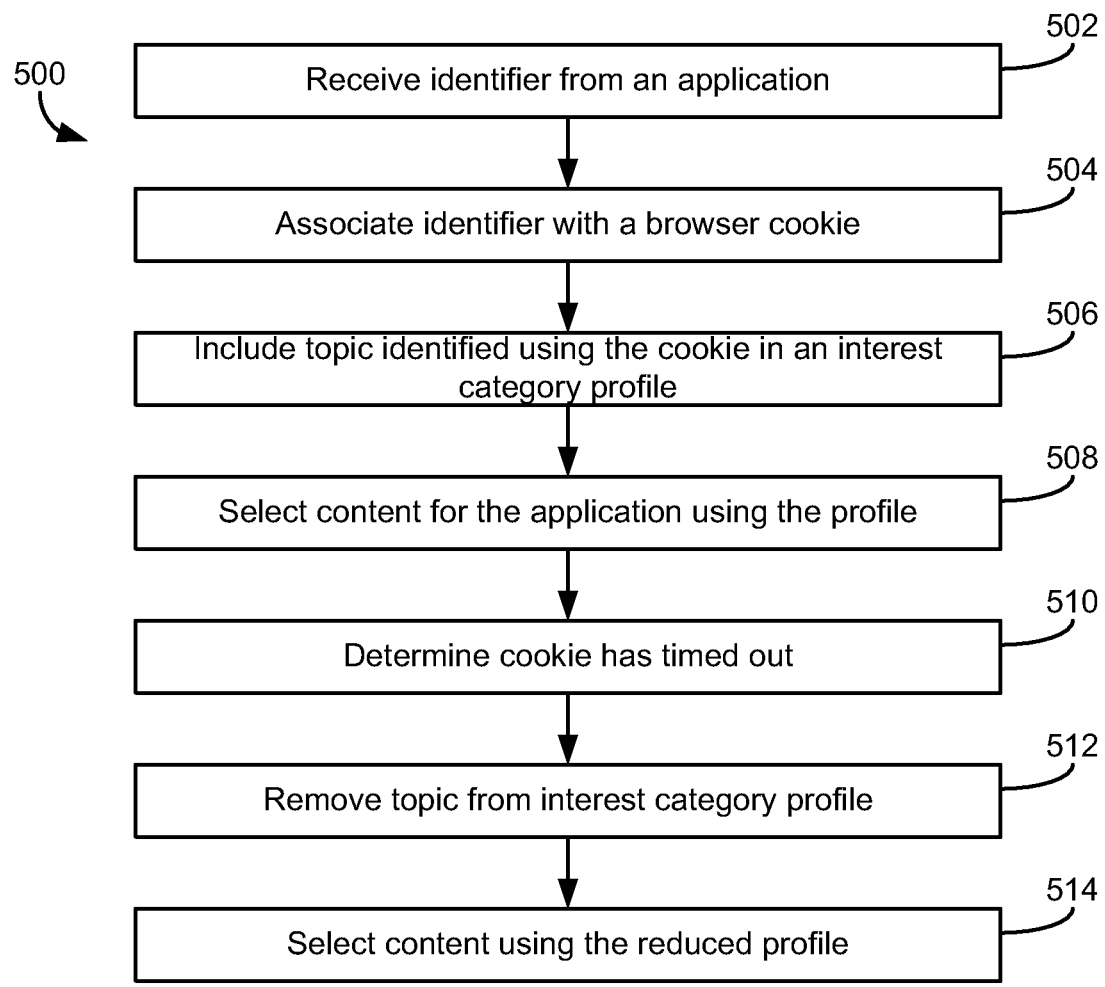
FIG. 5 is an illustration of a process for expiring the use of history data for an application on the same device, according to various implementations.

Referring now to FIG. 5, a process for expiring the use of history data for an application on the same device is shown, according to various implementations. Process 500 may be performed by one or more processing circuits, such as a processing circuit of a content selection service. In other implementations, the one or more processing circuits may comprise multiple computing devices as part of a distributed computing environment. In general, process 500 prevents history data associated with a web browser cookie to be used to select content for another application on the same device, if the browser cookie is inactive (e.g., the cookie has not been used for a threshold amount of time). In other words, the content selection service may assume that the cookie is inactive because of a privacy-related action performed by the user (e.g., the user cleared one or more cookies from the browser's cache, the user uninstalled the browser, etc.), regardless of the actual reasons for the inactivity (e.g., the user went on vacation, the user is in the hospital, etc.).

Process 500 includes receiving an identifier from an application (block 502). In various implementations, the application executed by the device differs from a web browser executed by the device. The web browser may use cookies or other device identifiers to generate history data to select content of relevance to the user of the device. Similarly, the device may also execute another application, such as a mobile application, web browser, or the like, that uses its own device identifiers. Exemplary device identifiers may include, but are not limited to, cookies, telephone number, hardware serials, UDIDs or other software-generated identifiers, network addresses (e.g., IP addresses, etc.), and combinations thereof.

Process 500 includes associating the received identifier with a browser cookie (block 504). The browser cookie may be a cookie set via a content selection service in the device's web browser. Similarly, the received identifier may be used by another application on the device (e.g., an application that differs from the web browser). Since the browser cookie and the device identifier both identify the same device, the content selection service may associate them with each other.

In some implementations, the cookie and the received identifier may be associated based on an explicit command from a user. For example, a user may specify to the content selection service that he or she owns a particular mobile phone or home computer. In other implementations, the service may use data such as a common network address, a common online profile or account, or a common set of registration data to link the device identifiers. For example, the device identifiers may be linked based on the user logging into an online service using both the device's web browser and another application (e.g., a stand-alone application configured to access the online service). In another example, the user may provide registration information during the installation of an application that may be matched to registration information previously provided by the user while installing the web browser or registering the device.

Process 500 includes including a topic identified using the browser cookie in an interest category profile (block 506). In various embodiments, history data generated using the browser cookie may be analyzed to identify a topic of potential interest to a user. In general, history data refers to any data indicative of an operation or event performed by the client device represented by the cookie. Exemplary operations and events may include, but are not limited to, visiting a webpage, making an online purchase, performing a social networking action (e.g., rating online content, sharing content, joining a group devoted to a particular topic, etc.), performing a search, requesting directions, playing an audio or video file, opening a certain screen within an application, utilizing a certain application, interacting with content (e.g., clicking on third-party content, playing third-party content, etc.), and combinations thereof. For example, the history data may be indicative of the cookie visiting a webpage devoted to golf. In another example, the history data may be indicative of a particular piece or type of third-party content being provided to web browser and/or an indication of an interaction with the provided content (e.g., a user clicks on the content, a user plays the content, etc.).

The history data may be from any number of different sources. In some implementations, the history data may be received from the server that provided a visited webpage to the web browser. For example, a website may provide a list of cookies that visited the website to the content selection service. In other implementations, the content selection service may receive an indication of a webpage visit as part of a content request. For example, a webpage that uses the content selection service may have an embedded content tag that causes the device to request third-party content from the selection service. In response to receiving the request, the service may store data regarding the visited webpage and the cookie. For example, the content selection service may create a database entry regarding the webpage visit and the cookie. In further implementations, the history data may be received in response to a request for the data. For example, the history data may be retrieved by a content selection service from a local or remote memory, in response to receiving a content selection request that includes the cookie.

History data may include timestamps for the events and operations indicated by the history data. For example, history data for the browser cookie may include a timestamp corresponding to when the cookie visited a particular webpage. In some implementations, the timestamp may be included in a content selection request from a client device. In other implementations, the content selection service may generate a timestamp on receipt of a content selection request or other indicator of the event or operation.

An identified topic from the cookie's history data may be used to generate an interest category profile. In some implementations, text and/or image recognition may be used on a website visited by the device or on an audio or video file played by the device (e.g., from an online streaming source). For example, history data for the cookie may indicate that the cookie was used to visit a golf-related webpage at a particular time and date. Similarly, a topic may be identified by using text recognition on the URL of a visited webpage. For example, the webpage located at http://www.golfscores.test may be devoted to the topic of sports. In further implementations, the history data may include a self-reported topic. For example, a webpage may include metadata that identifies the topic of the webpage. Other forms of history data that may be analyzed to identify a topic of potential interest to the user include data indicative of content interactions (e.g., whether the user clicked or played certain types of content), social networking actions (e.g., the user expressing a positive opinion about a topic), and search engine searches performed by the user. Any number of topics identified in this way may then be used to generate an interest category profile (e.g., a set of identified topics that may be of interest to the user). Such a profile may include the most recently identified topics, long-term interests, or most frequently identified topics from the cookie's history data. For example, the interest category profile may include the interest category of /Sports/Golf, if the web browser is often used to visited golf-related websites.

Process 500 includes selecting content for the application using the interest category profile (block 508). Once a topic has been identified based on actions performed in the web browser, the topic may be used by the content selection service to select third-party content for presentation by the other application on the device. For example, assume that an interest category profile includes the interest category of /Sports/Golf based on frequent visits to golf-related websites by the device's web browser. In such a case, the content selection service may select golf-related content for other applications on the device (e.g., a golf-related advertisement may be presented within a mobile application).

Process 500 includes determining that the cookie has timed out (block 510). In various implementations, the cookie may be determined to be inactive based on a comparison between the current time and the last timestamp associated with the cookie (e.g., the last time the cookie was used to visit a webpage). If the difference between these times is greater than a threshold value, the cookie may be deemed inactive. The time threshold may be any value. In various implementations, the threshold may be less than one day, less than two days, less than one week, less than one month, or any other length of time. The timestamp for the cookie used in the comparison may correspond to a timestamp in its history data or a timestamp for the last content selection request made using the cookie. For example, the difference between a timestamp for the last webpage visit by the cookie and the current time may be compared to a time threshold, to determine whether the cookie is inactive.

Process 500 includes removing the topic identified using the cookie from the interest category profile (block 512). According to various implementations, a timeout of the web browser's cookie may cause the content selection service to remove the cookie's history data from consideration when generating interest category profiles for the device. For example, assume that the browser cookie used to identify the golf-related topic goes unused for a period of one week. In such a case, the golf-related topic may be removed from the interest category profile. As a result, the content selection service may stop selecting golf-related content for presentation in the other application on the device. In some implementations, interest categories that were independently identified using history data from the other application may be retained in the profile. For example, assume that the other application is a video streaming application and that it is also used to stream golf highlights to the device. In such a case, the golf-related topic may still be retained in the profile. Other topics that were only identified using the browser cookie or fall below a certain metric when the browser cookie's history data is removed from consideration may still be removed. For example, a topic frequently identified in the cookie's history data and infrequently identified in the history data for the other application may fall below a frequency threshold when the cookie's history data is removed from consideration (e.g., after the cookie has timed out).

In some implementations, the history data associated with the cookie may be placed on hold, if the cookie is determined to be inactive (e.g., the cookie has timed out). The hold status may later be removed if the cookie is used later. While on hold, the cookie's history data may be stored in memory, but may not be used to select content for the other application. In various implementations, a hold status may last indefinitely or for a maximum amount of time. For example, the cookie's history data may be retained in memory on hold indefinitely until the cookie becomes active again. In another example, a time threshold may be compared to the last time the inactive cookie was active, to determine whether the cookie's history data is to be permanently removed from consideration to select content for the other application (e.g., by deleting the history data entirely or by barring its further use). In various implementations, such a threshold may be greater than one week, greater than one month, greater than one hundred and eighty days, or any other length of time. If the cookie becomes active again prior to being inactive for the threshold amount of time, the history data may again be made eligible for consideration to select content for the second application.

In one example, assume that a cookie set via the device's web browser is associated with history data indicative of webpage visits relating to parasailing and has been determined to be inactive. In such a case, the webpage visits relating to parasailing may be placed on hold and will not be used to select content for any other device identifiers linked to the cookie (e.g., identifiers for another application on the device). Also, assume that the system is configured to impose a maximum amount of time for a hold status of six months. If the cookie is inactive for six months, the history data may be permanently disassociated with the other device identifier. However, if the cookie is used two weeks after being determined to be inactive, it may be reactivated and the history data may again be used to select content for the linked device identifiers.

Process 500 includes selecting content for the application using the reduced interest category profile (block 514). As a result of the browser cookie being deemed inactive and its corresponding history data being prevented from use in the interest category profile, a topical category identified via the browser cookie may be removed from the interest category profile. However, the profile may still be based on history data associated with the other application's device identifier. For example, assume that the other application is a stand-alone application used to access a streaming video service. Also, assume that the application is used to watch videos related to parasailing. In such a case, the interest category profile used to select third-party content for the application may still include the topic of parasailing. Based on this, the content selection service may select parasailing-related content for presentation in the other application.

Figure 6:
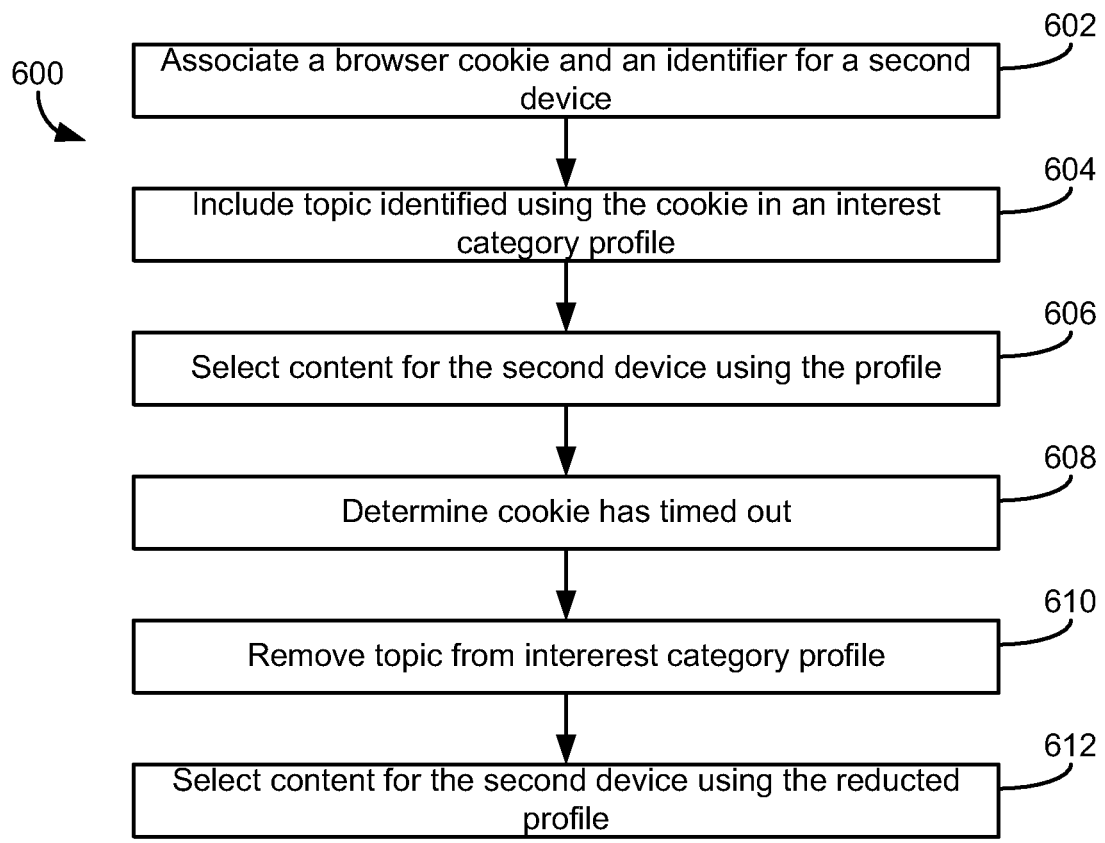
FIG. 6 is an illustration of a process for expiring the use of history data for an application on another device, according to various implementations.

Referring now to FIG. 6, an illustration of a process 600 for expiring the use of history data for an application on another device is shown, according to various implementations. Process 600 may be performed by one or more processing circuits, such as a processing circuit of a content selection service. In other implementations, the one or more processing circuits may comprise multiple computing devices as part of a distributed computing environment. Similar to process 500, process 600 allows for the privacy feature of timing out the use of a web browser's cookie to select third-party content for presentation in another application. In process 600, however, the other application may actually be on another device than that of the web browser. According to various implementations, processes 500 and 600 may be implemented in conjunction with one another or separately.

Process 600 includes associating a browser cookie set on a first device with an identifier for a second device (block 602). The cookie and other identifier may be associated either manually (e.g., in response to input from a user) or automatically (e.g., based on the cookie and other identifier being used to access the same online service). For example, a user may explicitly identify his mobile phone and home computer as belonging to the same user. In such a case, a cookie set in the home computer's web browser may be associated with a device identifier for the phone. In another example, the cookie may be associated with the identifier for the second device based on both devices being used to access the same online account (e.g., email account, social networking account, etc.).

Process 600 includes using a topic identified via the cookie in an interest category profile (block 604). As a result of the cookie and the identifier for the other device being associated, actions performed using one of the devices may be used to select third-party content for the other device. In some implementations, a combined interest category profile may be generated using history data associated with the cookie or history data associated with the identifier for the other device. For example, visits to golf-related webpages in the cookie's history data may be used to include a golf-related interest category in the combined interest category profile for the devices.

Process 600 includes selecting content for the second device using the interest category profile (step 606). In various implementations, a topic from the cookie's history data may be included in the interest category profile and used to select third-party content for the second device. For example, a golf-related interest category included in the profile based on the browser cookie's history data may be used to select golf-related content for another application on the second device.

Process 600 includes determining that the cookie has timed out (step 608). Similar to step 510 of process 500, a cookie may be determined to be inactive if the last time it was used to visit a website has exceeded a threshold amount of time. For example, the cookie may be determined to have timed out if it has not been used to visit a webpage within the past week.

Process 600 includes removing the topic from the interest category profile (step 610). Also similar to process 500, the history data associated with the timed-out cookie may be removed from consideration when generating the interest category profile. For example, if the cookie's history data is used to include the topic of golf in the profile and the cookie is later timed out, the golf-related interest category may be removed from the profile. In some implementations, the interest category profile may still include any topics identified using the second device's identifier. For example, if the web browser of the first device and the second device are both used to access parasailing-related content, the parasailing-related interest category may still be included in the interest category profile after the cookie is timed out (e.g., based on the second device independently accessing the parasailing-related content). Also similar to process 500, the cookie's history data may be permanently deleted or removed from consideration after time, may be reactivated prior to a second timeout threshold, or may be permanently deleted or removed from consideration after the second timeout threshold.

Process 600 includes selecting content for the second device using the reduced profile (step 612). In response to receiving a content selection request from the second device, the content selection service may use the reduced interest category profile to select third-party content for the second device. Any topics remaining in the reduced interest category profile may be used to select the third-party content. For example, assume that the second device is used to access soccer-related content. In such a case, the reduced interest category profile may still include soccer as an interest category. Based on this, the content selection service may select soccer-related content for presentation by the second device.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product embodied on a tangible medium or packaged into multiple such software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method of limiting the use of data associated with a cookie set within a web browser on a client device, the cookie being associated with a topic, the method comprising:
    receiving, at a processor, a device identifier from an application on the client device that differs from the web browser;
    associating, by the processor, the device identifier with the cookie;
    analyzing, by the processor, one or more user actions performed in a social networking service accessed by the web browser to identify the topic;
    including, by the processor, the topic in an interest category profile;

selecting, by the processor, content for presentation within the application using the interest category profile;

determining, by the processor, that a period of time from when the cookie was last used to visit a webpage has exceeded a threshold value;

removing, by the processor, the topic associated with the cookie from the interest category profile based on the determination that the period of time has exceeded the threshold value to create a reduced topic set; and selecting, by the processor, content using the reduced interest category profile.

2. The method of claim 1, further comprising:
deleting the cookie from a data storage device based on the determination that the period of time has exceeded the threshold value.

3. The method of claim 1, further comprising:
receiving, at the processor, an indication that the cookie is being used by the web browser to visit a webpage; and
restoring the topic to the interest category profile based on the cookie being used to visit a webpage.

4. The method of claim 1, further comprising:
determining, by the processor, that the period of time from when the cookie was last used by the web browser to visit a webpage has exceed a second threshold value; and
deleting the cookie from a data storage device based on the determination that the period of time has exceeded the second threshold value.

5. The method of claim 1, further comprising:
analyzing, by the processor, one or more webpages visited by the web browser to identify the topic; and
associating the topic with the interest category profile.

6. A system for limiting the use of data associated with a cookie set within a web browser on a client device, the cookie being associated with a topic, the system comprising a processor configured to:
receive a device identifier from an application on the client device that differs from the web browser;
associate the device identifier with the cookie;
analyze one or more user actions performed in a social networking service accessed by the web browser to identify the topic;
include the topic in an interest category profile;
select content for presentation within the second application using the interest category profile;
determine that a period of time from when the cookie was last used to visit a webpage has exceeded a threshold value;
remove the topic associated with the cookie from the interest category profile based on the determination that the period of time has exceeded the threshold value to create a reduced topic set; and
select content using the reduced interest category profile.

7. The system of claim 6, wherein the processor is further configured to delete the cookie from a data storage device based on the determination that the period of time has exceeded the threshold value.

8. The system of claim 6, wherein the processor is further configured to:
receive an indication that the cookie is being used by the web browser to visit a webpage; and
restore the topic to the interest category profile based on the cookie being used to visit a webpage.

9. The system of claim 6, wherein the processor is further configured to:
determine that the period of time from when the cookie was last used by the web browser to visit a webpage has exceed a second threshold value; and
delete the cookie from a data storage device based on the determination that the period of time has exceeded the second threshold value.

10. The system of claim 6, wherein the processor is further configured to:
analyze one or more webpages visited by the web browser to identify the topic; and
associating the topic with the interest category profile.

11. The system of claim 6, wherein the device identifier comprises a hashed value of a hardware-based identifier.

12. A method of limiting the use of data associated with a cookie set within a web browser on a first client device, the cookie being associated with a topic, the method comprising:
associating, by a processor, the cookie with a device identifier for a second client device based on the cookie and the device identifier being used to access an online account;
analyzing, by the processor, one or more user actions performed in a social networking service accessed by the web browser to identify the topic;
including, by the processor, the topic in an interest category profile;
selecting, by the processor, content for presentation by the second device based on the interest category profile;
determining, by the processor, that a period of time from when the cookie was last used to visit a webpage has exceeded a threshold value;
removing the topic from the interest category profile based on the determination that the period of time has exceeded the threshold value; and
selecting, by the processor, content using the reduced interest category profile.

13. The method of claim 12, further comprising:
deleting the cookie from a data storage device based on the determination that the period of time has exceeded the threshold value.

14. The method of claim 12, further comprising:
receiving, at the processor, an indication that the cookie is being used by the web browser to visit a webpage; and
restoring the topic to the interest category profile based on the cookie being used to visit a webpage.

15. The method of claim 12, further comprising:
determining, by the processor, that the period of time from when the cookie was last used by the web browser to visit a webpage has exceed a second threshold value; and
deleting the cookie from a data storage device based on the determination that the period of time has exceeded the second threshold value.

16. The method of claim 12, further comprising:
analyzing, by the processor, one or more webpages visited by the web browser to identify the topic; and
associating the topic with the interest category profile.

17. The method of claim 12, wherein the online account is associated with at least one of a social networking service, a document storage service, or an email service.

18. The method of claim 12, wherein the device identifier comprises a hashed value of a hardware-based identifier.

* * * * *